US008558405B2

(12) United States Patent
Brogan et al.

(10) Patent No.: US 8,558,405 B2
(45) Date of Patent: Oct. 15, 2013

(54) METHOD AND SYSTEM FOR OPERATING AND CONTROLLING A WIND TURBINE TO PREVENT EXCITATION OF SUBSYNCHRONOUS OSCILLATIONS WITHIN THE WIND TURBINE

(75) Inventors: Paul Brian Brogan, Glasgow (GB); Robert J. Nelson, Orlando, FL (US)

(73) Assignee: Siemens Aktiengesellschaft, Munich (DE)

( * ) Notice: Subject to any disclaimer, the term of this patent is extended or adjusted under 35 U.S.C. 154(b) by 140 days.

(21) Appl. No.: 13/116,806

(22) Filed: May 26, 2011

(65) Prior Publication Data
US 2012/0299305 A1 Nov. 29, 2012

(51) Int. Cl.
*F03D 9/00* (2006.01)
*G05F 1/70* (2006.01)

(52) U.S. Cl.
USPC ............................................ 290/55; 323/207

(58) Field of Classification Search
None
See application file for complete search history.

(56) References Cited

U.S. PATENT DOCUMENTS

| | | | |
|---|---|---|---|
| 4,438,386 A | 3/1984 | Gyugyi | |
| 5,083,039 A | 1/1992 | Richardson | |
| 5,227,713 A * | 7/1993 | Bowler et al. | 322/58 |
| 5,513,090 A * | 4/1996 | Bhattacharya et al. | 363/40 |
| 2005/0207190 A1* | 9/2005 | Gritter | 363/40 |
| 2007/0121354 A1* | 5/2007 | Jones et al. | 363/47 |
| 2008/0205093 A1 | 8/2008 | Davies | |
| 2009/0134850 A1 | 5/2009 | Berggren | |
| 2010/0090537 A1 | 4/2010 | Larsen | |
| 2010/0090538 A1 | 4/2010 | Larsen | |
| 2010/0133915 A1 | 6/2010 | Asplund | |
| 2010/0327584 A1 | 12/2010 | Fortmann | |
| 2011/0057446 A1 | 3/2011 | Acedo et al. | |
| 2011/0101689 A1* | 5/2011 | Larsen et al. | 290/44 |
| 2011/0248569 A1* | 10/2011 | Son et al. | 307/87 |

FOREIGN PATENT DOCUMENTS

WO WO 2010121784 A1 10/2010
WO WO 2011032265 A1 3/2011

OTHER PUBLICATIONS

Lee, R.J., Pillay, P., Harley, R. G., "D,Q Reference Frames for the Simulation of Induction Motors", Apr. 9, 1984, Department of Electrical Engineering, University of Natal (South Africa).*
Rai, A Novel Approach for Damping Subsynchronous Resonance Using a STATCOM, Fifteenth National Power Systems Conference, IIT, Bombay, India, Dec. 2008, pp. 535-540.
Keshavan, Damping of Subsynchronous Oscillations Using a STATCOM—A FACTS Controller, 2004 International Conference on Power System Technology, Singapore, Nov. 21-24, 2004, pp. 12-16.
Seyedkazemi, Genetic Algorithm Application to Control of STATCOM for Damping Subsynchronous Resonance, Proceedings of the 7th WESEAS International Conference on Power Systems, Beijing, China, Sep. 15-17, 2007, pp. 216- 220.
Salemnia, Mitigation of Subsynchronous Oscillations by 48-Pulse VSC STATCOM Using Remote Signal, 2009 IEEE Bucharest Power Tech Conference, Jun. 28-Jul. 2, 2009, Bucharest, Romania.

* cited by examiner

*Primary Examiner* — Tulsidas C Patel
*Assistant Examiner* — Sean Gugger

(57) ABSTRACT

A full converter connected to a series compensated transmission line. The full converter comprises a generator side converter, a DC link connected across an output of the generator side converter, a line side converter connected across an output of the DC link, and a converter controller configured to control the full converter to mitigate effects of subsynchronous oscillations present on the series compensated transmission line.

21 Claims, 3 Drawing Sheets

METHOD AND SYSTEM FOR OPERATING AND CONTROLLING A WIND TURBINE TO PREVENT EXCITATION OF SUBSYNCHRONOUS OSCILLATIONS WITHIN THE WIND TURBINE

FIELD OF THE INVENTION

The present invention relates generally to a power converter for use within a wind turbine connected to a power system grid, (the grid having one or more series compensated transmission lines) where the converter prevents the excitation of subsynchronous oscillations on the grid and further the converter isolates the wind turbine components from the effects of any subsynchronous oscillations.

BACKGROUND OF THE INVENTION

Increasingly wind power turbines are and will be connected to an electrical grid via a series-compensated transmission line having a capacitor connected in series with the transmission line. The capacitor compensates the voltage drop across the primarily-inductive transmission line. Use of series capacitors allows the transfer of more power on a series compensated transmission line than on a line without series compensation. Line compensation is a cost effective solution for increasing the capacity of a transmission system because, typically, installation of series capacitors is less expensive than construction of new transmission lines.

Disadvantageously, series-compensated transmission lines are prone to exhibit subsynchronous oscillations (SSOs). These subsynchronous oscillations occur when the electric power system exchanges energy with the physical components of the turbine-generators (including high and low pressure turbines, the generator and the exciter, all of which share a common shaft) at one or more frequencies below the electrical system synchronous frequency. Thus these oscillations are referred to as subsynchronous oscillations.

Subsynchronous torsional interactions (SSTI) are produced when a disturbance-caused electrical resonant frequency excites a natural torsional mode (mechanical) frequency of the turbine-generator shaft (e.g., of a synchronous or an induction generator). The series compensated line with its lower electrical resonant frequency interacts with the torsional natural frequency of the turbine-generator shaft, exciting the subsynchronous oscillations in the generator. Even small magnitude disturbances in the electrical power system can create large magnitude subsynchronous resonance oscillations in the turbine-generator shaft, which are typically lightly damped. Such an excitation of a resonance by SSOs is commonly called subsynchronous resonance (SSR). When it involves a torsional natural frequency of a turbine-generator shaft, the SSR is commonly called an SSTI.

When a mechanical torsional oscillation mode is excited by the SSOs, the rotor of the synchronous generator acts like an induction generator rotor operating at the "slip" frequency, where the slip frequency is the difference between the system frequency and the SSR frequency. This action amplifies the SSR currents and causes the turbine-generator shaft to oscillate at its natural torsional frequency. Within seconds, these undamped resonant oscillations may increase to an endurance limit of the shaft, resulting in shaft fatigue and possibly damage and failure.

At a New Mexico plant in 1970, connected to a roughly 90% series compensated transmission line, the SSR oscillations were sufficiently intense to physically break the generator shaft, causing significant damage to the turbine and generator.

SSR oscillations can also interact with a wind turbine control system and thereby potentially excite torsional oscillations in the wind turbine generator shaft. These types of SSRs are commonly called subsynchronous control interactions (SSCI).

Induction generators (DFIGs and directly-connected wind turbines) have torsional natural frequencies that can respond to subsynchronous excitation, resulting in SSTI. This type of machine can also go into a "self-excitation mode" when the series capacitor resonates with the electrical inductances of the machine and of the transmission line and interconnecting transformers.

SSCI on a series compensated line has been identified as causing damage to doubly-fed induction generator (DFIG) wind turbines in Texas.

FIG. 1 illustrates a transmission line 1 with a source generator 2 and a load or receiving end generator 3. FIG. 2 is a vector diagram illustrating the relationship among the source voltage $V_S$, the load end or receiving end voltage $V_R$ and the line inductive reactance $jX_L l$, where $X_L$ is the inductive reactance per unit length of line and l is the line length. This analysis ignores the line resistance. The maximum power that can be carried by the line is responsive to the variable $\delta_1$, the angle between the source voltage and the receiving end voltage. As the line impedance declines (or is compensated by a series capacitor) the length of the vector $jX_L l$ becomes shorter, the length of the vectors $V_S$ and $V_R$ approach equality, the angle $\delta_1$ approaches 0, and the power transfer capacity of the transmission line approaches its maximum.

FIG. 3 illustrates a series compensated line 5 with a capacitor C in series with the line inductance L. FIG. 4 is a vector diagram illustrating the relationship among the source voltage $V_S$, the load end or receiving end voltage $V_R$, the inductive line reactance $jX_L l$ and the compensating series capacitive reactance $-jX_C l$, where $X_C$ is the capacitive reactance per unit line length and l is the line length. The series capacitor compensates or cancels a portion of the inductive reactance as shown by the vector diagram, resulting in an angle $\delta_2$ less than the angle $\delta_1$.

Thus the transmission line in the series compensated case of FIG. 3 can carry more power than the uncompensated line of FIG. 1.

The power transfer capacity of a transmission line can also be expressed as proportional to the quantity $V^2/X_L$, where V is the voltage and $X_L$ is the inductive reactance of the line. If a series capacitor is introduced into the line, the power transfer capacity is $V^2/(X_L-X_C)$, where $X_C$ is the reactance of the series capacitor. If the series capacitive reactance is half of the series inductive reactance, the power transfer capacity doubles.

In the cases presented above, an increase in power transfer capability comes at the expense of creating an electrical resonant subsynchronous frequency equal to $60 \times (\sqrt{}/(X_C/X_L))$ in a 60 Hz system. For example, a line that has 70% ratio series compensation (i.e., $X_C/X_L=0.7$) has a resonant frequency of roughly 50 Hz (i.e., $60 \times \sqrt{(0.7)}=50.2$). To a generator rotor operating at 60 Hz, this appears to be a pair of frequencies of roughly 10 Hz and 70 Hz. The former value is determined as the difference between the system electrical frequency (60 Hz) and the mechanical resonant frequency (50 Hz). The supersynchronous frequency of 70 Hz is usually damped by mechanical system components, but the low frequency (or subsynchronous frequency) of 10 Hz is only lightly damped and may grow if excited by continual subsynchronous oscillations produced within the transmission system. If a generator rotor torsional natural frequency is at or near this subsynchronous frequency the torsional mode is excited, generating additional SSR currents at the subsynchronous frequency and creating a positive feedback situation (i.e., more SSR current creating larger oscillations, etc.). These oscillations can impose high magnitude excitations on the generator shaft, ultimately causing damage to the rotor shaft. For example, these excitations can cause torsional fatigue, due to excessive shaft twisting, that can eventually lead to shaft failure and/or damage to components attached to the shaft.

In addition to increasing power transfer capacity, series capacitors also improve transient and steady state system stability, reduce rapid voltage fluctuations, and reduce line losses. However, as described, the use of series capacitors may promote SSR in the power system as a series compensated transmission line inevitably has a lower electrical resonant frequency than the fundamental frequency (e.g., 50 Hz or 60 Hz) of the power system.

The causes and consequences of subsynchronous resonance are exacerbated by the continued growth of power transmission system interconnections. Also, transmission line inductance changes with time as generators and loads are brought on and off line, as transformers outages occur and as transmission systems topologies are changed to accommodate power demands.

Interactions between a series compensated line and power electronic device (such as a static VAR compensator) and the torsional natural frequency of a generator are referred to as subsynchronous torsional interactions (SSTI). Interactions between a power electronic controller and a series-compensated transmission system are referred to as subsynchronous control instability (SSCI). Both SSTI and SSCI are considered subcategories of SSR and are types of Subsynchronous Interactions (SSI).

SSOs distort the voltages and currents on the transmission system, and are typically expensive and difficult to filter out. These distorted voltages and currents are processed by the control elements of the transmission system (static VAR compensators, for example), possibly causing improper firing of thyristors or insulated gate bipolar transistors that comprise these control elements. As a result, a compensator itself can introduce negative damping and other instabilities into the system, resulting in SSCI.

Actual and potential damage resulting from the effects of these SSOs have discouraged electric utilities from using series capacitor compensation with synchronous generators. In fact, for several years after the New Mexico incident the utility industry throughout the world largely stopped installing new series capacitors to compensate series inductive reactance. Instead, utilities installed new transmission lines (because of the inability to extend the capability of existing lines by using series capacitor compensation) or found ways to exercise existing lines to higher capability.

Utilities began using FACTS (Flexible AC Transmission System) controllers, including static synchronous compensators (STATCOMS) to control SSOs. As a result of these efforts to reduce SSOs, the use of series capacitor compensation appears to be staging a comeback, in particular in Texas and the western US.

FACTS controllers control both real and reactive power flow on a transmission line. Since STATCOMS (one class of FACTS controllers) were developed in the early 1990s by Westinghouse Electric Corporation, several schemes have been developed using STATCOMs to damp SSR oscillations. One technique is described in a paper entitled, "A Novel Approach for Subsynchronous Resonance Damping Using a STATCOM" by Rai, et al., which was presented at the Fifteenth National Power Systems Conference in Bombay, India in December 2008.

The SSR oscillations are a 3-phase balanced voltage set. Therefore, another technique employs a shunt-connected STATCOM controller to deliberately introduce a phase voltage imbalance (by introducing an asymmetrical voltage) to reduce the electromechanical coupling between the electrical and mechanical components of the turbine-generator. The reduced coupling reduces the exchange of energy between the electrical and mechanical components and limits the effects of the SSR oscillations.

Other FACTS-based devices and techniques to damp SSR oscillations include: thyristor-controlled series compensators, the NGH series damper and solid state series compensators (SSSC). These devices are expensive and difficult to operate and control. Further, they must be protected from the effects of short circuits and the attendant short circuit current they are subjected to.

Due to current efforts to reduce consumption of natural resources, the conversion of wind energy to electrical energy using wind turbine generators is becoming more prevalent. Wind turbines exploit wind energy by converting the wind energy to electricity for distribution to end users.

A fixed-speed wind turbine is typically connected to the grid through an induction (asynchronous) generator for generating real power. Wind-driven blades drive a rotor of a fixed-speed wind turbine that in turn operates through a gear box (i.e., a transmission) at a fixed rotational speed. The fixed-speed gear box output is connected to the induction generator for generating real power. The rotor and its conductors rotate faster than the rotating flux applied to the stator from the grid (i.e., higher than the synchronous field frequency). At this higher speed, the direction of the rotor current is reversed, in turn reversing the counter EMF generated in the rotor windings, and by generator action (induction) causing current (and real power) to be generated in and flow from the stator windings. The frequency of the generated stator voltage is the same as the frequency of the applied stator voltage providing the excitation. The induction generator may use a capacitor bank for reducing reactive power consumption (i.e., the power required to generate the stator flux) from the power system.

The fixed-speed wind turbine is simple, reliable, low-cost and proven. But its disadvantages include uncontrollable reactive power consumption (as required to generate the stator rotating flux), mechanical stresses, limited power quality control and relatively inefficient operation. In fact, wind speed fluctuations result in mechanical torque fluctuations that then result in fluctuations in the electrical power on the grid.

In contrast to a fixed-speed wind turbine, the rotational speed of a variable speed wind turbine can continuously adapt to the wind speed, with the blade speed maintained at a relatively constant value corresponding to a maximum electrical power output through the use of a gear box disposed between the wind turbine rotor and the generator rotor. The variable speed wind turbine may be of a doubly-fed induction generator (DFIG) design or a full converter design. The doubly-fed induction generator uses a partial converter to provide power from the wound induction generator rotor and the power system The full converter wind turbine is typically equipped with a synchronous or asynchronous generator (the output of which is a variable frequency AC based on the wind speed) and connected to the grid through a power converter that rectifies the incoming variable AC to DC and inverts the DC to a fixed-frequency 60 Hz AC. Variable-speed wind turbines have become widespread due to their increased efficiency over fixed-speed wind turbines and superior ancillary service capabilities.

The present invention controls a variable speed wind turbine systems to avoid exciting SSOs on an electrical transmission system and a method related thereto. Further, the present invention isolates a variable speed wind turbine from the effects of SSR on the electrical transmission system.

BRIEF DESCRIPTION OF THE DRAWINGS

The invention is explained in the following description in view of the drawings that show.

DETAILED DESCRIPTION OF THE INVENTION

Figure 1:
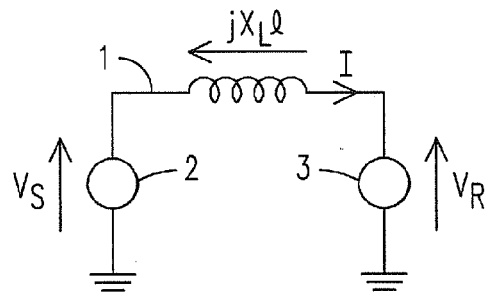
FIG. 1 is a schematic diagram of a power transmission system, including sending and receiving end voltage sources and an intervening transmission line.
Figure 2:
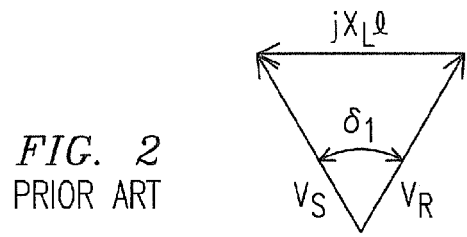
FIG. 2 is a vector diagram depicting the power transmission system of FIG. 1.
Figure 3:
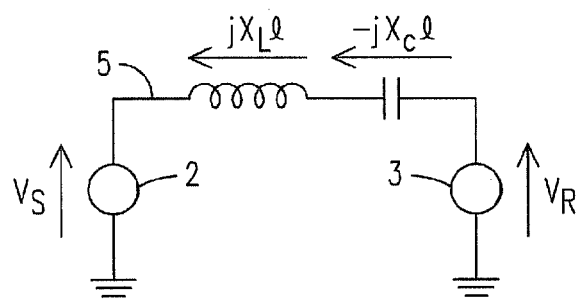
FIG. 3 is a schematic diagram of a power transmission system, including sending and receiving end voltage sources and an intervening transmission line with series capacitive compensation.
Figure 4:
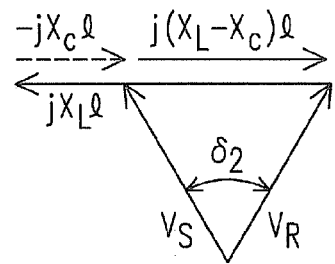
FIG. 4 is a vector diagram depicting the power transmission system of FIG. 3.

Before describing in detail the particular methods and systems related to operating and controlling a wind turbine to limit the effects of SSTI and SSCI within the wind turbine in accordance with various embodiments of the present invention, it should be observed that the present invention, in its various embodiments, resides primarily in a novel and non-obvious combination of hardware, method steps and software elements related to said method and system. Accordingly, the hardware, method steps and software elements have been represented by conventional elements in the drawings, showing only those specific details that are pertinent to the present invention so as not to obscure the disclosure with structural details that will be readily apparent to those skilled in the art having the benefit of the description herein.

The following embodiments are not intended to define limits of the structures or methods of the invention but only to provide exemplary constructions. The embodiments are permissive rather than mandatory and illustrative rather than exhaustive.

The present invention relates to controlling wind turbines to limit the effects of power system SSR on the wind turbines.

Figure 5:
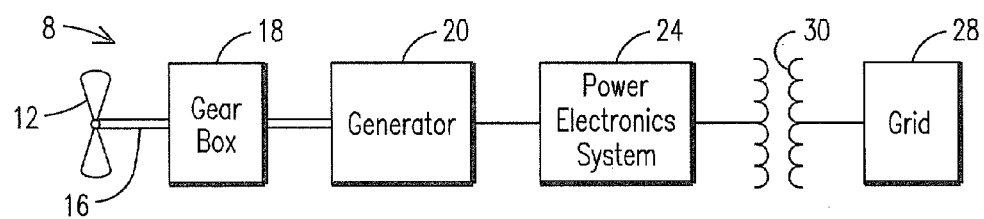
FIG. 5 is a block diagram of a prior art variable speed wind turbine system.

FIG. 5 illustrates components of an exemplary variable-speed wind turbine 8, including rotor blades 12 for converting wind energy to rotational energy for driving a rotor shaft 16 connected to a gearbox 18. By varying the rotor speed according to varying wind conditions, more efficient energy generation can be achieved over a range of wind speeds. The wind turbine also includes a structural support component, such as a tower and a rotor pointing mechanism, not shown in FIG. 5. The gearbox 18 converts low speed rotation to high speed rotation for driving a three-phase generator 20 (commonly an AC induction generator) to generate three-phase electricity. The gear box 18 is not always required. Typically a plurality of wind turbines 8 are sited at a common location, referred to as a wind turbine park.

Electricity generated by the generator 20 is supplied to a power electronics system 24 to adjust the generator output voltage and/or frequency for supply to a grid 28 via a step-up transformer 30. The low-voltage side of the transformer 30 is connected to the power electronics system 24 and the high-voltage side to the grid 28. The power electronics system 24 is controllable to impart characteristics to the generated electricity as required to match or modify characteristics of the electricity flowing on the grid 28.

Different generators 20 are used for different wind turbine applications, including both asynchronous (induction) generators (e.g., squirrel cage, wound rotor and doubly-fed induction generators) and synchronous generators (e.g., wound rotor and permanent magnet synchronous generators). Advantageously, the induction generators are relatively simple and inexpensive, but disadvantageously the stator requires a reactive magnetizing current and therefore consumes reactive power from the grid.

The power electronics system 24 comprises different elements for different turbine-generator installations and applications, including rectifiers, inverters and frequency converters (e.g., back-to-back, multilevel, tandem, matrix and resonant converters).

One type of converter, referred to as a full converter or back-to-back converter, employed in a variable speed wind turbine comprises a power converter connected to the generator side, a DC link and a power converter connected to the grid side. The frill converter converts an input voltage, i.e., a fixed frequency alternating current, a variable frequency alternating current (due to variable wind speed) or a direct current derived by rectifying the generated AC voltage, as generated by the wind turbine, to a desired output frequency and voltage as determined by the grid that it supplies. Typically using insulated gate bipolar transistors (IGBTs), the generator-side converter (also referred to as a generator bridge) converts the electricity produced by the generator to DC and transfers this energy to the DC link. From the DC link the electricity is supplied to the grid-side converter (also referred to as a network bridge) where it is transformed to fixed frequency AC electricity and supplied to the grid.

Figure 6:
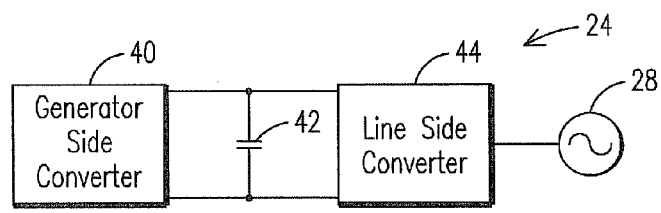
FIG. 6 is a block diagram of a power electronics system of FIG. 5.

One embodiment of a full converter, illustrated in FIG. 6, includes a generator-side converter 40 for converting the generated AC electricity to DC and an output capacitor 42 for filtering the DC current. DC current is supplied to a line side converter 44 (inverter) for producing AC power at the grid fundamental frequency (i.e., typically 50 Hz or 60 Hz) for supplying to the grid 28. The amount of power available from the wind turbine is determined by operation of the generator-side converter.

The variable speed wind turbines as depicted in FIGS. 5 and 6 have the advantage of both variable speed control of the generator (to permit generating the maximum amount of electricity as the wind speed varies) and full dynamic control of the line side currents.

The problem addressed by the present invention has become more apparent as new wind turbine projects are planned and analyzed. In the case of a wind turbine using a full converter, the inventors have discovered that use of closed loop vector current control or direct active power/reactive power control methods within the line side converter avoids excitation of subsynchronous torsional and control interactions within wind turbine components due to SSOs on the grid, and avoids the generation of SSOs within the wind turbine converters. Thus the present invention contemplates an active damping solution to the SSR/SSTI/SSCI phenomena via control action of the line side converter. Use of a full converter, according to the present invention, allows the connection of wind power turbines (i.e., wind turbine parks) to a series-compensated transmission line without danger of exciting subsynchronous resonance oscillations in the components of the wind turbine.

The inventive step of the present invention is the use of a full converter within a wind turbine as a solution to the stability issues associated with series compensated transmission lines and the SSR oscillations that may be generated on the compensated power system. The closed loop current control methodology within the full converter provides immunity of the wind turbine to these SSR oscillations and avoids the generation of SSOs within the wind turbine.

To mitigate the effects of SSR oscillations, the full converter of the present invention uses a closed loop current controller, which is responsive to an active (real) power demand signal and an AC voltage demand signal.

However this technique operates equally well in other embodiments where the line side converter is responsive to:
1. Specified values of a positive and/or negative sequence DQ axis current demand signals, i.e., Iqp (q-axis positive sequence current), Idp (d-axis positive sequence current), Iqn (q-axis negative sequence current), Idn (d-axis negative sequence current).
2. A DC link voltage demand signal in conjunction with an AC voltage/reactive power/power factor/reactive current/idle power demand signal
3. A modulation depth demand signal in conjunction with an AC voltage/reactive power/power factor/reactive current/idle power demand signal.
4. A power demand signal in conjunction with an AC voltage/reactive power/power factor/reactive current/idle power demand signal.

Any combination of the above signal parameters also suffices for controlling the closed loop current controller.

According to the present invention, the full converter can use any combination of control algorithms and pulse width modulation control, such as DQ axis synchronously rotating current control, QP control, power Vac control, power/idle power control, Vdc, Q, Vac, modulation depth control, direct power control virtual flux observer, direct power control sliding mode current control and any combination of power bridge, two level or multi-level three phase bridges, space vector, sine triangle comparison, look up tables or reference voltage based schemes, bus clamped PWM, and or triplen enhanced PWM, hysteretic or sliding mode variable switching frequency schemes.

The application of vector control within the line side converter provides control action that achieves a near zero steady state-error at the synchronous frequency of the current controller, with the line side converter synchronized to the fundamental frequency of the electrical system, e.g., 60 or 50 Hz. To achieve this near zero steady state error condition, the line side converter open loop gain is relatively high at the fundamental frequency. But at other frequencies (especially SSR frequencies that are typically below 90% of the fundamental frequency) the gain is relatively low. The vector control algorithm damps or avoids the excitation of SSR oscillations within the electrical system. Such applications of vector control may be applied to fixed switching frequency PWM converters or variable switching frequency PWM converters.

The control algorithm of the present invention implements the following open loop gain equation, which describes the open loop gain of the current controller within the line side converter (or network bridge) of the full converter.

$$G_{O/1} = [Ig(s)Y(s)]/[1-Vg(s)Z11(s)Y(s)]$$

where,

Ig(s) is the frequency dependent complex gain of the combined positive and negative sequence current controller's contribution to Vpwm, Y(s) is the total frequency dependent complex admittance of the electrical system as seen from the terminals of the power converter, Vg(s) is the frequency dependent complex gain of the positive and negative sequence voltage feed-forward contribution to Vpwm, Vpwm is the ideal, controlled voltage source, representation of the pulse width modulator, and Z11(s) is the frequency dependent complex impedance of the electrical system as viewed from the point at which the voltage is measured.

Figure 7:
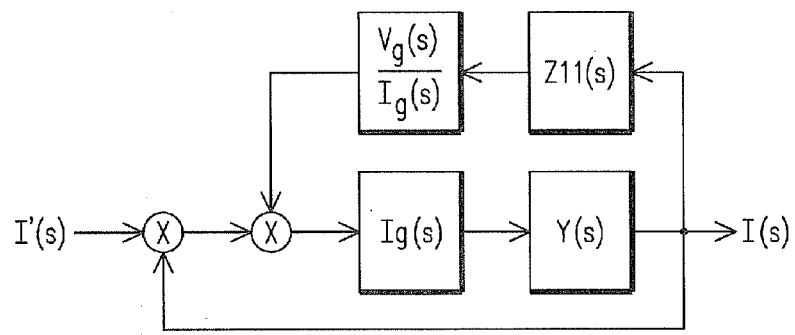
FIG. 7 is a block diagram of a controller according to the present invention.

See FIG. 7.

Within this current controller there are two contributions to the pulse width modulated (PWM) voltage reference that in turn is modified to control the current. The first contribution is via the measured three phase current feedback which is multiplied by Ig(s), and the second contribution is via the measured three phase voltage which is multiplied by Vg(s). The combined open loop gain equation between the current demand I*(s) and the actual current flowing I(s), see FIG. 7, in the line side converter of the full converter is shown in the equation above. The term Vg(s) in the equation provides a relatively small gain for any frequency above about 0.5 Hz.

The term Z11 is required because the voltage is measured across a portion of an effective voltage divider.

The term on right in the denominator of the equation is near zero frequencies above about 0.5 Hz and therefore the open loop gain is approximately equal to Ig(s) Y(s).

DQ axis control provides relatively high gain at the fundamental frequency (60 Hz in 60 Hz systems and 50 Hz in 50 Hz systems) and relatively low gain at other frequencies. This couples high gain at the system frequency with low gain at other frequencies.

Thus the problems associated with SSR/SSTI/SSCI interactions with the wind turbine components is fundamentally solved by use of a full converter comprising a line side converter that uses closed loop vector current control resulting in a relatively high gain at the fundamental frequency, a relatively low gain at subsynchronous frequencies, and a phase shift at subsynchronous frequencies that results in a stable and damped, closed loop system.

The DQ axis 'vector' current controller provides the SSI damping characteristic of the present invention. The three-phase current feedback signal is input as Ifb and the resulting PWM output Vpwm provides the closed loop current control.

Figure 8:
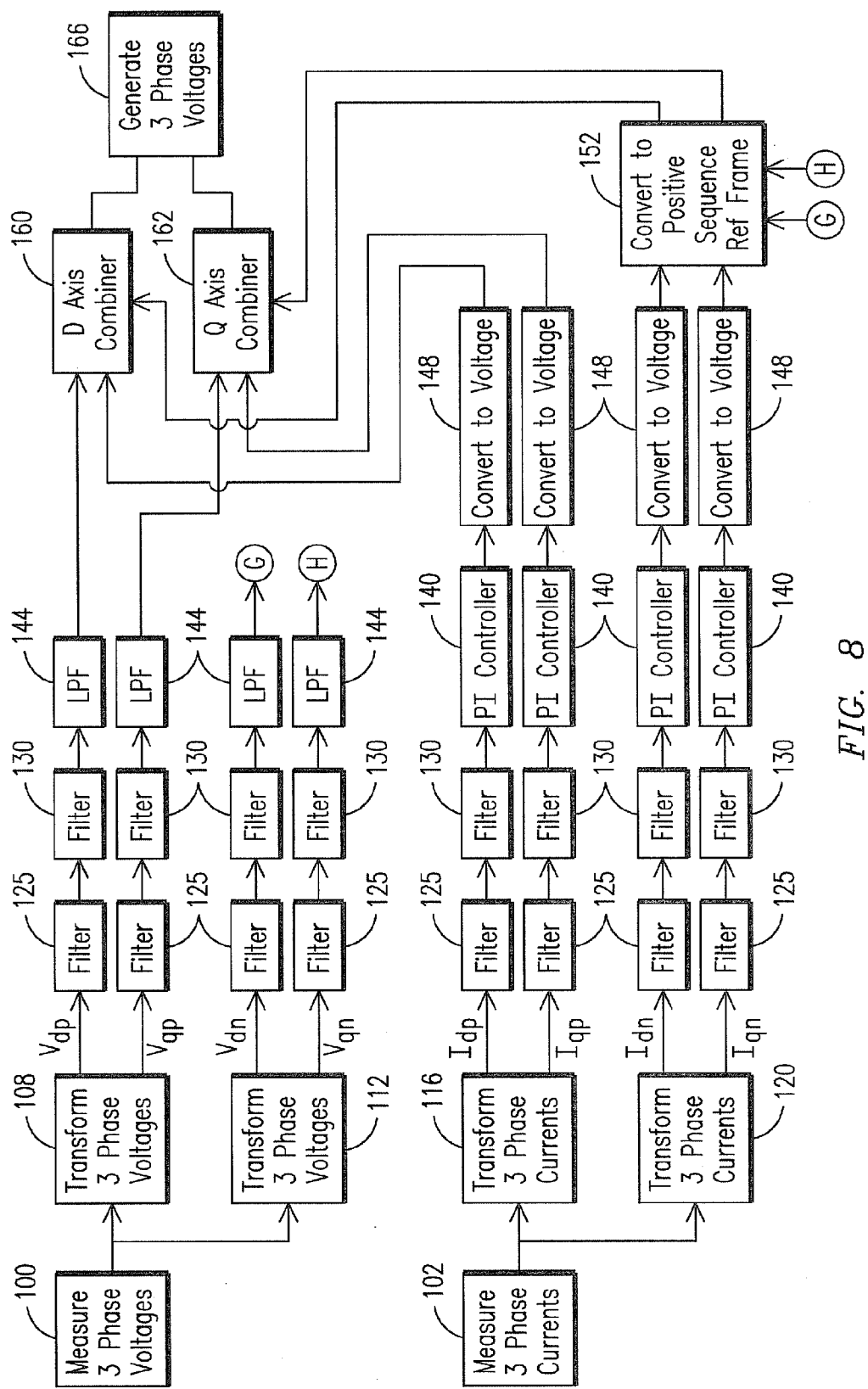
FIG. 8 is a block diagram of the closed-loop current controller within the line side converter.

FIG. 8 is a block diagram of the closed-loop current controller within the line side converter according to the present invention. Typically, the closed-loop controller is implemented in a microprocessor or a digital signal processor. The positive sequence current is controlled within a positive sequence reference frame and the negative sequence current is controlled within a negative sequence reference frame. In the steady state, the reference and feedback signals are DC quantities. Through the action of proportional-integral controllers, the steady state error of both the positive and negative sequence DQ axis current components is substantially zero. This controller also includes a voltage feed-forward component that also makes a contribution to the final PWM output voltage.

The closed-loop current controller generates the signal Vpwm, which in effect is a three-phase controllable voltage source.

The three phase voltages and currents are measured as represented by blocks 100 and 102, respectively. Within a block 108, the three phase voltages are transformed to two DC values, one value, Vdp, representing the positive sequence voltages and the other value, Vqp, representing quadrature components of the positive sequence voltages, on a synchronously rotating reference frame, that is synchronous to the fundamental freq of the grid, i.e., 50 or 60 Hz. Similarly a block 112 transforms the three phase voltages to two DC values, one value, Vdn, representing the negative sequence voltages and the other value, Vqn, representing quadrature components of the negative sequence voltages on a synchronously rotating reference frame that is synchronous to the fundamental frequency, the 'negative sequence.' The Q axis, as represented by the subscript "q" in the voltage values, is in phase with the peak of the real phase voltage, and the D axis in quadrature with it.

The three phase currents are similarly transformed into DC values in blocks 116 and 120 to produce DC values Idp, Iqp, Idn and Iqn.

The values Vdp, Vqp, Vdn and Vqn and Idp, Iqp, Idn and Iqn (where the subscript "q" refers to the Q axis and "d" refers to the D axis; "p" refers to positive sequence and "n" refers to negative sequence) are separately passed through notch filters 125 to attenuate ripple on the DC values. The ripple appearing in one reference frame is caused by the opposing sequence component. The notch filter 125 attenuates the ripple at 2*f0 (where f0 is the fundamental frequency of the grid). Notch filters 130 attenuate higher frequency resonance components (i.e., higher than the fundamental frequency) that may be present in a typical wind farm collector system within the wind turbine farm or within the external network.

The four filtered current components are input to four separate PI (proportional integral) controllers 140 to reduce the steady state error to zero for the four current components.

The four voltage components are individually input to four low pass filters 144 that have a long time constant, which provides substantially zero gain at frequencies above about 0.5 Hz.

Within four blocks 148 on the current side, the four current values are converted to voltage values based on the inductive reactance of the transmission system.

Within a block 152, the four negative sequence voltages (two of which have been derived from the negative sequence currents) are converted to two positive sequence voltages, one on the D axis and the other on the Q axis. In a combiner 160 the D axis positive sequence voltage from the block 152 is combined with the filtered D axis positive sequence voltage Vdp and the filtered positive sequence voltage derived from the D axis positive sequence current Idp. In a combiner 162 the Q axis quadrature positive sequence voltage from the block 152 is combined with the filtered Q axis positive sequence voltage Vqp and the positive sequence voltage derived from the filtered Q axis positive sequence current Iqp.

Output signals from the combiners 160 and 162 are input to a three phase PWM modulator 166 for generating the three phase voltage signals output from the line side converter 44 of FIG. 6.

The present invention is also applicable to a permanent magnet synchronous generator (PMSG), where the induction generator and gearbox are replaced with a permanent magnet motor. The above discussion also applies to this type of generator as it is primarily the line side converter that prevents SSR excitations in the wind turbine or exciting the SSR.

In one embodiment the control scheme of the present invention operates in an autonomous manner. Thus communications links to remote sites or voltage/current measurements remote from the wind turbine or the wind turbine park are not required.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A full converter connected to a series compensated transmission line, the full converter comprising:
    a generator side converter;
    a DC link connected across an output of the generator side converter;
    a line side converter connected across an output of the DC link, the line side converter further comprising;
    a converter controller configured to control the line side converter, the converter controller responsive to measured three phase voltages and measured three phase currents on the transmission line, each phase voltage and each phase current is transformed into a d-axis positive sequence value, a q-axis quadrature positive sequence value, a d-axis negative sequence vale and a q-axis quadrature negative sequence value and combined to generate a combined d-axis value and a combined q-axis value; and
    a three phase pulse width modulated modulator for receiving the combined d-axis and the combined q-axis values for generating three phase voltage signals supplied to the series compensated transmission line to mitigate effects of subsynchronous oscillations present on the series compensated transmission line.

2. The full converter of claim 1 wherein the converter controller employs one of a synchronously rotating vector current control algorithm to mitigate effects of subsynchronous oscillations or multiple synchronously rotating vector current control algorithms to mitigate effects of subsynchronous oscillations.

3. The full converter of claim 1 for use with a wind turbine.

4. The full converter of claim 1 wherein a control loop of the converter controller is further effective to damp the subsynchronous oscillations.

5. The full converter of claim 1 wherein the subsynchronous oscillations cause subsynchronous resonance oscillations that comprise one or both of subsynchronous control interactions and subsynchronous torsional interactions.

6. The full converter of claim 1 wherein the converter controller comprises a control loop having a desired amplitude and phase shift at frequencies other than a fundamental frequency of current carried on the series compensated transmission line.

7. A wind turbine connected to a series compensated transmission line, the wind turbine comprising:
    rotor blades for turning by wind;
    an electric generator rotatably coupled to the rotor blades for generating electricity;
    a full converter responsive to the electricity generated by the electric generator, the full converter further comprising:
        a generator side converter responsive to the electricity generated by the electric generator;
        a DC link connected across an output of the generator side converter;

a line side converter connected across an output of the DC link, the line side converter further comprising;

a converter controller configured to control the line side converter, the converter controller responsive to measured three phase voltages and measured three pulse currents on the transmission line, each phase voltage and each phase current is transformed into a d-axis positive sequence value, a q-axis quadrature positive sequence value, a d-axis negative sequence value and a q-axis quadrature negative sequence value and combined to generate a combined d-axis value and a combined q-axis value; and a three phase pulse width modulated modulator for receiving the combined d-axis and the combined q-axis values for generating three phase voltage signals supplied to the series compensated transmission line to mitigate effects of subsynchronous oscillations present on the series compensated transmission line.

8. The wind turbine of claim 7 wherein the converter controller employs one of a synchronously rotating vector current control algorithm to mitigate effects of subsynchronous resonance oscillations or multiple synchronously rotating vector current control algorithms to mitigate effects of subsynchronous oscillations.

9. The wind turbine of claim 7 wherein a control loop of the converter controller is further effective to damp the subsynchronous oscillations.

10. The wind turbine of claim 7 wherein the subsynchronous oscillations cause subsynchronous resonance oscillations that comprise one or both of subsynchronous control interactions and subsynchronous torsional interactions.

11. The wind turbine of claim 7 wherein the converter controller comprises a control loop having a desired amplitude and phase shift at frequencies other than a fundamental frequency of current carried on the series compensated transmission line.

12. The wind turbine of claim 7 wherein the electric generator comprises one of an induction generator and a synchronous generator.

13. A power system comprising:
a series compensated transmission line;
a wind turbine connected to the power system via the series compensated transmission line, the wind turbine further comprising;
rotor blades for turning by wind;
an electric generator rotatably coupled to the rotor blades for generating electricity; and
a full converter responsive to the electricity generated by the electric generator, the full converter further comprising:
a generator side converter responsive to the electricity generated by the electric generator;
a DC link connected across an output of the generator side converter;
a line side converter connected across an output of the DC link, the line side converter further comprising;
a converter controller configured to control the line side converter, the converter controller responsive to measured three phase voltages and measured three phase d-axis positive sequence value, a q-axis quadrature positive sequence value, a d-axis negative sequence value and a q-axis quadrature negative sequence value and combined to generate a combined d-axis value and a combined q-axis value; and a three phase pulse width modulated modulator for receiving the combined d-axis and the combined q-axis values for generating three phase voltage signals supplied to the series compensated transmission line to mitigate effects of subsynchronous oscillations present on the series compensated transmission line.

14. The power system of claim 13 wherein the converter controller employs a synchronously rotating vector current control algorithm to mitigate effects of subsynchronous resonance oscillations or multiple synchronously rotating vector current control algorithms to mitigate effects of subsynchronous oscillations.

15. The power system of claim 13 wherein a control loop of the converter controller is further effective to damp the subsynchronous oscillations.

16. The power system of claim 13 wherein the subsynchronous oscillations cause subsynchronous resonance oscillations that comprise one or both of subsynchronous control interactions and subsynchronous torsional interactions.

17. The power system of claim 13 wherein the converter controller comprises a control loop having a desired amplitude and phase shift at frequencies other than a fundamental frequency of current carried on the series compensated transmission line.

18. The power system of claim 13 wherein the electric generator comprises one of an induction generator and a synchronous generator.

19. A method for reducing effects of subsynchronous oscillations on a series compensated transmission line, the method comprising:
generating electricity by rotation of an electric generator;
converting the electricity to a frequency and a voltage suitable for supply to the series compensated transmission line by action of a full converter;
within a control loop of the full converter, controlling the full converter responsive to measured three phase voltages and measure three phase currents on the transmission line, each phase voltage and each phase current is transformed into a d-axis positive sequence value, a q-axis quadrature positive sequence, value, a d-axis negative sequence, value and a q-axis quadrature negative sequence value and combined to generate and combined d-axis value and a combined q-axis value; and
a three phase pulse width modulator receiving the combined d-axis and the combined q-axis values for generating three phase voltage signals supplied to the series compensated transmission line to migrate effects of subsynchronous oscillations present on the series compensated transmission line.

20. The method of claim 19 the control loop employing a synchronously rotating vector current control algorithm to mitigate effects of subsynchronous oscillations.

21. The method of claim 19 wherein control loop of the full converter operates to damp the subsynchronous oscillations.

* * * * *